ALVIN GUY VAN ALSTYNE
JAMES CHRISTOPHER SAMPSON
INVENTORS

BY [signature]

ATTORNEY

Aug. 21, 1962   A. G. VAN ALSTYNE ETAL   3,050,708
TIME REFERENCE GENERATOR
Filed May 8, 1956   2 Sheets-Sheet 2
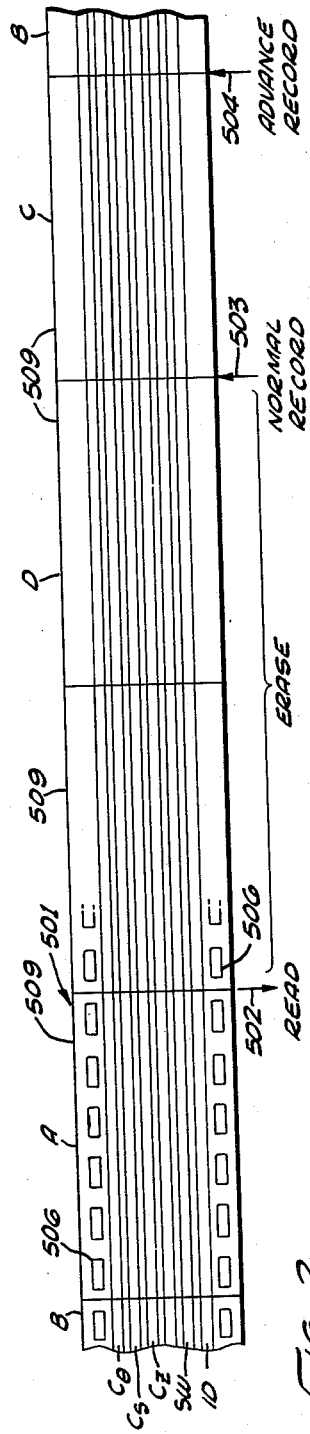
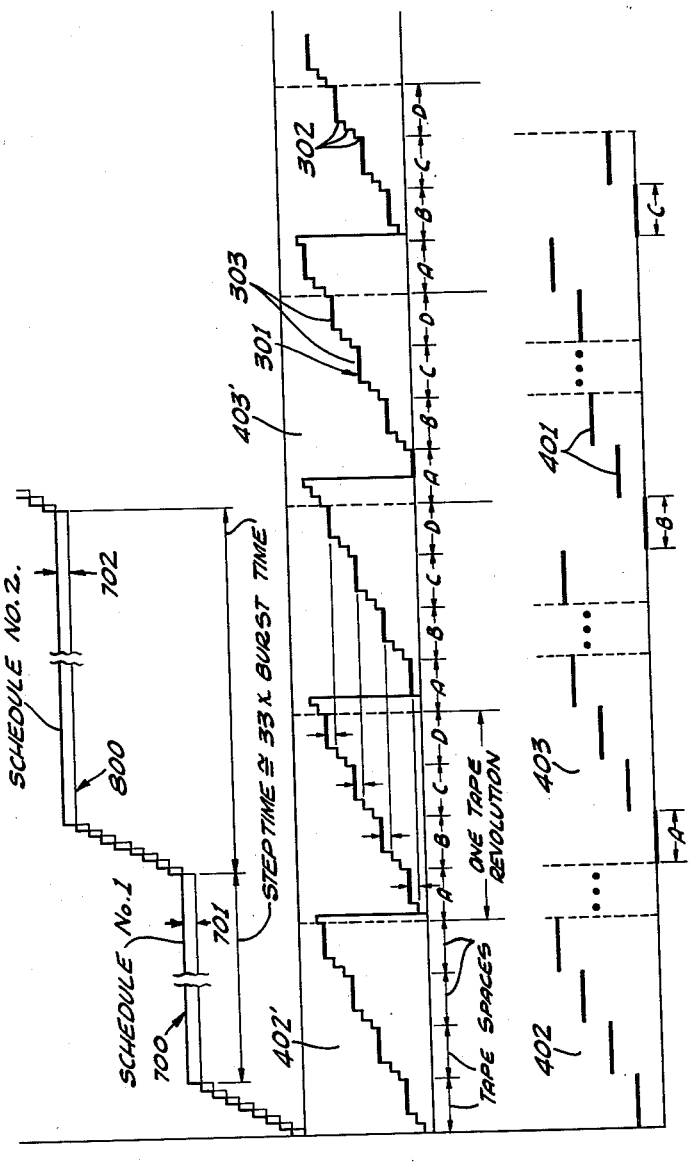
ALVIN GUY VAN ALSTYNE
JAMES CHRISTOPHER SAMPSON
INVENTORS
BY
ATTORNEY 3,050,708
TIME REFERENCE GENERATOR
Alvin Guy Van Alstyne, Los Angeles, and James Christopher Sampson, West Covina, Calif., assignors to Gilfillan Bros., Inc., Los Angeles, Calif., a corporation of California
Filed May 8, 1956, Ser. No. 583,523
2 Claims. (Cl. 340—23)

This invention relates to devices for sequentially generating a plurality of voltages proportional to the times to arrival of a number of aircraft being directed to an "entry gate" or the point of initial radar detection of a ground controlled approach (GCA) or other type of landing system. More particularly, the invention relates to means for generating a continually moving or vertically decreasing staircase time reference voltage for use with an air traffic control system employed to direct a large number of aircraft in rapid succession to and through the entry gate of a landing system.

In air traffic control systems of the above-described type it is necessary to generate a voltage standard proportional to a selected time to arrival of an aircraft in order that this standard may be compared with an aircraft flight time to the entry gate as computed by the system and based on the known position, course and velocity of the aircraft. Speed error control signals are then generated by the system comparison device or control computed when a discrepancy happens to exist between the selected time to arrival and the computed flight time. These control signals are accordingly communicated to the pilot or autopilot of the aircraft so that correction may be made in the speed of the aircraft to put it exactly on schedule, i.e. to guide it so that it will pass through the entry gate exactly at its selected time of arrival.

In order to guide a large number of aircraft through a landing system entry gate at a rapid rate, e.g., at 30 second intervals, it has been found desirable to utilize a staircase time-to-arrival reference voltage so that error control signals for each aircraft guided may be computed periodically and sequentially on a time shared basis and in a sequence determined by the respective times to arrival of each. The problem of generating this staircase voltage is particularly difficult because the staircase waveform must continually appear to decrease in magnitude as the time to arrival of each aircraft decreases. For example, after one staircase has been generated, a second must be generated with steps lower in magnitude than the corresponding steps of the first. The incremental difference in the first and second staircase magnitudes therefore should represent a change in time to arrival equal to the time needed to generate one whole staircase. This is required because the staircase generated preferably reverts to each time-to-arrival voltage only after the generation of a whole staircase.

Mechanical methods have been proposed for the generation of a continually moving staircase voltage wherein a commutator structure is used in combination with a motor driven potentiometer. The conductive segments of the commutator, however, must each be connected to stationary potentiometer taps through slip rings, the potentiometer thereby impressing a time varying voltage on each of the conductive commutator segments. In this arrangement the potentiometer driving mechanism must necessarily be synchronized with the commutator driving mechanism. In addition the commutator driving mechanism must be synchronized with the air traffic control system with which it is used. This mechanical wave generating apparatus is then unusually complicated because of the synchronization required. It is also extremely complicated by slip rings and insulation problems related to commutation. For example, it is necessary that the commutator have 100 conductive segments to accommodate the guidance of 100 aircraft in a typical air traffic control system. For this reason, these types of mechanical systems are both difficult and expensive to construct and to maintain.

Mechanical staircase generators proposed in the past have also been proven to be inadequate because they are inflexible, i.e., the computation interval of the error control signals, the time between aircraft arrivals, or the system capacity cannot be changed without introducing a large modification in or a complete abandonment of mechanical equipment originally used.

The present invention overcomes these and other disadvantages in the prior art by providing a relatively short digital pulse counter operated through a bistable gate by a pulse generator and a relatively long digital pulse counter operated through the same gate. The gate is pulsed to its "on" state by a control system timing pulse, the "on" pulse indicating that the computation of error control signals for a particular aircraft has been initiated. The short counter is set to count a number of pulses proportional to the ratio of the product of the time interval between aircraft arrivals and the error signal computation rate to the capacity of the associated air traffic control system. The short counter then sets the bistable gate to the "off" position until another timing pulse is impressed upon it. The long counter counts all the pulses passed by the gate, but it is set to count a number of pulses proportional to the product of the time interval between aircraft arrivals and the error signal computation rate plus one more pulse. The state of the long counter is then employed to indicate aircraft times to arrival sequentially according to the magnitude of these times to arrival. A staircase output voltage is then produced with the use of a digital-to-analog converter.

It is apparent from the foregoing that binary digital counters may easily be employed for the short and long counters used in the invention. For this reason the invention may be easily and economically constructed. For example, the counters may include flip-flops or trigger circuits utilizing twin triode vacuum tubes. In a typical case for aircraft time-to-arrival intervals of 30 seconds, an error signal computation rate of 30 per second, and an air traffic control system capacity of 100 aircraft, the short counter may be set to count 9 pulses and therefore will require only four twin triodes. The long counter may be required to count a minimum of 901 pulses. This, however, requires that the long counter have only 10 tubes and makes the invention much more practical than mechanical devices.

The present invention is also unusually flexible, i.e., a change in count on the long and short counters may be very easily made to accommodate a change in aircraft arrival intervals, in the error signal computation rate, or in the air traffic control system capacity. The flexibility of the invention over any mechanical apparatus is thus very evident.

According to a specific feature of the invention the long and short counters of the time reference generator are employed in combination with a synchronizing and storage mechanism which may be employed to set the error signal computation rate. In one particular embodiment of the invention the synchronizing and storage mechanism may comprise the timing pulse source, record means for storing the identities of guided aircraft, and means for reproducing these identities from the record means at the error signal computation rate.

In a preferred embodiment of the invention the record means is passed under reproducing means by driving means at a rate to cause identities to be read at the error signal computation rate. In this same embodiment of the invention, the driving means is also employed to operate the timing pulse source synchronously with the record means and thereby to cause the timing pulse source to generate pulses at the same error signal computation rate.

It is therefore an object of the invention to provide a novel time reference generator for an air traffic control system.

It is a more specific object of the invention to provide a digital time reference generator for an air traffic control computer.

It is another object of the invention to provide a time reference generator for an air traffic control computer which may be easily constructed with a few inexpensive components.

It is a still further object of the invention to provide a time reference generator which may be easily and quickly adapted to function properly in any number of air traffic control systems in which aircraft arrival intervals, error signal computation rates, or system capacities may vary.

Yet a further object of the invention is to provide means whereby air traffic control system error signal computation may be synchronized with a time reference generator.

These and other objects and advantages of the present invention will be better understood with the following description taken in connection with the accompanying drawing made a part of the specification, wherein an embodiment is illustrated by way of example. The device of the present invention is by no means limited to the specific embodiment illustrated since it is shown merely for the purposes of description.

FIG. 2 is a broken plan view of a magnetic recording shown in FIG. 1; and

FIG. 3 is a graph of waveforms characteristic of the operation of the embodiment of the invention shown in FIG. 1.

Figure 1:
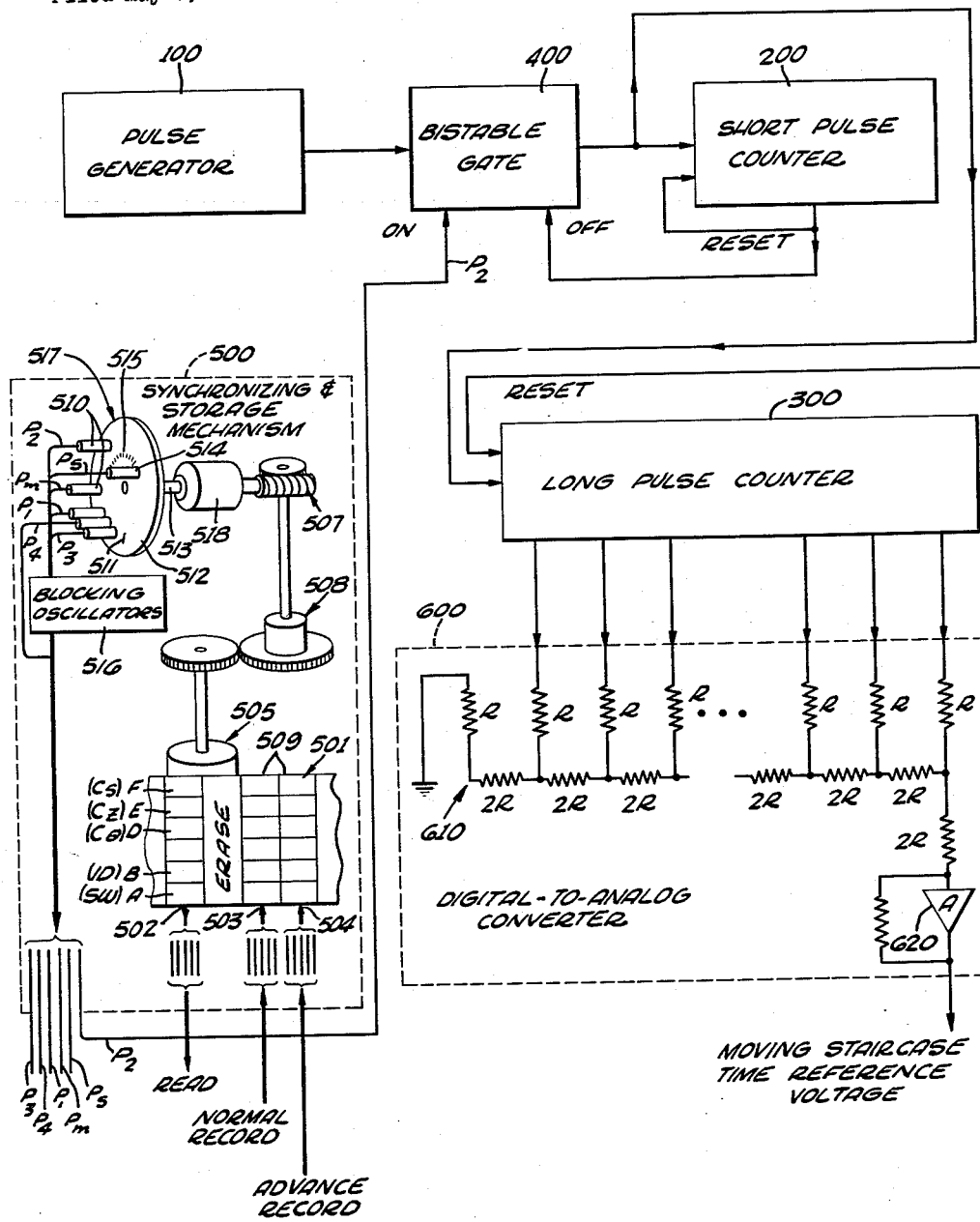
FIG. 1 is a diagrammatic view of one embodiment of the invention.

In the drawing in FIG. 1 a pulse generator 100 is shown connected to a short pulse counter 200 and a long pulse counter 300 to a bistable gate 400 which is pulsed on by a synchronizing and storage mechanism 500 and pulsed off by a reset pulse generated by the short counter 200. The digital number registered by the long counter 300 is converted into an analog value by a digital-to-analog converter 600 which includes a powers-of-two network 610 and an amplifier 620. The powers-of-two network 610 is connected to each of the separate binary counters of the long counter 300 and thereby produces a moving staircase time reference voltage at the output of the amplifier 620 which is indicative of the digital state of the long counter 300. The operation of the digital-to-analog converter 600 is well known in the art and is explained in U.S. Patent No. 2,709,770.

The pulse generator 100 preferably should have a pulse repetition frequency greater than a timing pulse $P_2$ delivered to the gate 400 by the synchronizing and storage mechanism 500. The timing pulse source 500 is a synchronized pulse source which initiates the computation of air control signals in a typical air traffic control system.

The short counter 200 may be set to count the number of pulses S given in the following relationship:

$$S = \frac{nAR}{C_{(1)}}$$

where $n$ is any positive integer, A is the time of arrival intervals of aircraft in an air traffic control system, R is the error signal computation rate of the system corresponding to the pulse repetition frequency of $P_2$, and C is the capacity of the system.

For clarity of explanation in relation to the waveforms shown in FIG. 3 characteristic of the operation of the invention numerical values will be assigned to the operational constants of the air traffic control system with which the invention is to be used. These are as follows:

$n = 1$
$A = 30$ seconds
$R = 30$ per second
$C = 100$ aircraft

It is seen from the values assigned above that it is desirable to choose values A and R such that AR is a positive integer in order that the long counter 300 may be set to count an integral number of pulses, or at least that $nAR$ is a positive whole number. In order that the short counter 200 may be set to count an integral number of pulses it is also desirable that C is chosen such that $$\frac{nAR}{C}$$

is also a positive whole number.

A staircase waveform 700 is shown in FIG. 3 where the synchronizing and storage mechanism 500 opens bistable gate 400 when the short counter 200 and the long counter 300 are both set to zero. The waveform 700 is intended to represent the output voltage of the digital-to-analog converter 600 although the converter 600 may be appropriately connected to produce only the large staircase steps and not the small steps thereshown. When the bistable gate 400 is opened by a timing pulse $P_2$ from synchronizing and storage mechanism 500, a burst of pulses are impressed upon both short counter 200 and long counter 300. This burst of pulses will be the number that the short counter 200 is set to count, which in the instant case is $$S = \frac{1 \times 30 \times 30}{100} = 9$$

The number of pulses counted by short counter 200 and long counter 300 is then stopped by the short counter 200 since a reset pulse is impressed upon the bistable gate 400 to stop the pulses passed by it from the pulse generator 100.

The level of the first large step of the waveform 700 shown in FIG. 3 is then representative of the time to arrival (TTA) of a schedule No. 1 or a TTA of an aircraft assigned to that schedule and which is the next succeeding aircraft to be directed through the landing system entry gate. The output of the digital-to-analog converter 600 then rises to a next step which indicates the TTA schedule No. 2. Converter 600 is caused to rise again by the synchronizing and storage device 500 which opens the bistable gate 400 to admit pulses from pulse generator 100 to the short counter 200 to count 9 more pulses and then to shut off the bistable gate 400. The long counter 300 then registers these same additional 9 pulses and stands in a state representative of the time to arrival of the second succeeding aircraft selected to pass through the landing system entry gate.

The long counter will count a number of pulses equal to L given by the following relationship:

$$L = n(AR + 1) \quad (2)$$

According to the numerical values chosen above this will be $L = 1(30 \times 30 + 1) = 901$. Since the capacity of the associated landing system is 100 aircraft and the last TTA schedule will be schedule No. 100 as indicated in the waveform 700. The long counter will then receive the first pulse generated by pulse generator 100 and passed through bistable gate 400 by the application of a timing pulse source 500. After the long counter has registered this first pulse of what would appear to be the initiation of a rise to a schedule No. 101, the long counter 300 resets to zero and counts the remaining pulses passed by the bistable gate 400 before it is turned off by the short counter 200. The short counter 200 will count 9 pulses regardless of the state of the long counter 300. For this reason after 9 pulses have passed through the bistable gate 400 it will be shut off by the long counter 300 by a reset pulse impressed thereon. As stated previously the long counter 300 is set to count 901 pulses. Therefore, after the long counter 300 is set to 0 and only 8 pulses are passed by the bistable gate 400, the TTA schedule 1 appearing on the staircase waveform 800 shown in FIG. 3 will be one pulse lower than the TTA schedule No. 1 shown in the waveform 700. This is indicated as the dimension 701.

Schedule No. 2 is 9 pulses displaced from schedule No. 1 as shown in the waveform 700, and schedule No. 1, is also displaced 9 pulses from the schedule 2 shown in the waveform 800. This is true because after the first 8 pulses are counted when the waveform 800 is being generated, the operation of long counter 300 is exactly the same or analogous to the generation of the waveform 700. Since the schedule No. 1 of waveform 800 is one small step below the waveform 700, the schedule No. 2 of waveform 800 will also be a small step below schedule No. 2 of waveform 700. This is indicated by the dimension 702. It is thus evident that the sawtooth voltage generated appearing at the output of digital to analog converter 600 will continually move downwardly until it has moved down nine small steps which are fractions of the large steps of the waveforms 700 and 800. After TTA schedule No. 1 is lowered nine steps, it will then be zero. The next succeeding schedule, which has thus far been called schedule No. 2, then assumes the classification of schedule 1 but will appear at a different error signal in computation interval or data interval position.

By choosing $n$ equal to a number larger than 1, the generated staircase waveform will be continually moved downwardly a number of steps at a time equal to $n$. It is thus seen that the use of $n$ as a positive integer larger than 1 would normally serve no useful purpose except to complicate the equipment employed.

It is thus obvious that the pulse repetition frequency of pulse generator 100 should be at least equal to SR or, from Equation 1, $$\frac{nAR^2}{C}$$

Preferably the pulse generator 100 has a pulse repetition frequency greater than $$\frac{nAR^2}{C}$$

For example, the waveform 700 illustrates incremental steps occurring at a frequency of 12,000 per second. The large TTA step time for each schedule thus is approximately equal to 33 times the burst time for the nine incremental steps.

In order for the long counter to reduce TTA, step levels $$\frac{L}{S}$$

must therefore be equal to a whole number plus a fraction.

In FIG. 1 the synchronizing and storage mechanism 500 is shown including record means of a magnetic tape 501 which is employed to store error control signals with corresponding coded aircraft identities and error signals for subsequent transmittal to aircraft in the air traffic control system associated with the monitoring system of the invention. The mechanism 500 also sets the data interval and computation rate of the system. A drum storage device may obviously be substituted for the tape 501. Speed command signals $C_s$ are stored at an F position on the tape 501; altitude command signals $C_z$ are stored at a position E on the tape 501; and lateral control command signals $C_\theta$ are stored at a position D on the tape 501. The binary coded identity of an aircraft is stored at a position B on the tape 501 and a control switch code is stored at a position A on the tape 501. A binary code of the identity of an aircraft is indicated by ID and the switch code is indicated by SW.

Information is read by conventional reproducing means including reading heads. Information is read from the tape 501 at a point 502 therealong. Normally information is recorded at a point 503 on the tape 501 and information is recorded in advance at a point 504 on the tape 501 where reassignment of aircraft to an advance schedule is desired, e.g. where all aircraft are required to hold by circling at a constant altitude and range because the landing system associated with the air traffic control system is incapable of receiving aircraft.

The tape 501 is moved by driving means including a 32-tooth capstan drive 505, the teeth of which project through holes 506 in the tape 501 as shown in FIG. 2. In a representative example the capstan 505 is driven by a synchronous motor 518 having a shaft 513 operating at 1800 r.p.m. through a worm gear reducer 507 and a spur gear reducer 508. The worm gear reducer 507 may be at a ratio of 12:1 and the spur gear reducer 508 may be at a ratio of 1:2.25. The net reduction from the 1800 r.p.m. shaft of the synchronous motor 518 is then 16:3.

Six sprocket holes 506 are provided in the tape 501 in a section 509 thereof where the command signals, identity and switch code of one aircraft are recorded. In response to the driving means one section 509 of the tape 501 passes under the read heads in 33⅓ milliseconds. The length of the tape between the read point 502 and the normal record point 503 is immaterial although in a representative case two tape sections such as a section 509 are provided between these points as shown in FIG. 2. The length of the tape around the capstan from the normal record point 503 to the read point 502 is then 594 sprocket holes. Thus as the command signals, identity and switch code of one aircraft is being read those of another are being recorded.

The command signals for each aircraft are generated every 3⅓ seconds. Timing pulses $P_1$, $P_M$, $P_2$, $P_3$, and $P_4$, synchronizing associated system components with the speed of the tape 501 during each 33⅓ milliseconds data interval represented by one section 509 of the tape 501, are provided by a timing pulse source 517. The source 517 includes five magnetic pickup heads 510 energized by a ferrous slug 511 in a phenolic wheel 512 on the 1800 r.p.m. shaft 513 of the synchronous motor 518. A sixth magnetic pickup head 514 is energized by ten additional ferrous slugs 515 on the same phenolic wheel 512. The magnetic pickup head 514 thus generates a group of ten consecutive pulses in an interval between synchronizing pulses $P_1$ and $P_2$. These pulses are employed in what is known as the internal shift period of the system. The internal shift period is characterized by the fact that a current identity and switch code are read from the tape 501 and a different identity and switch code are simultaneously recorded thereon. All the timing pulses are applied five blocking oscillators 516 except the pulse $P_4$ which is amplified elsewhere in the system.

Recording digital data on the tape 501 consists of saturating D.C. current in the recordheads representing one in digital code being recorded in zero current representing "zero." Thus the magnetic tape 501 is left in a saturated state established by the D.C. erase for the binary "0" representation and is saturated with the opposite polarity flux for the binary "1" representation.

Analog data is recorded as a single "1" pulse whose width is proportional to the amplitude of the control pulse signal which it represents. In a representative example an analog pulse width equal to 3.3 milliseconds may be assumed to a zero command signal whereas a pulse whose width is less than 3.3 milliseconds may be considered a negative command signal and a pulse whose width is larger than 3.3 milliseconds may be considered a positive command signal. The pulse $P_1$ initiates the shift period which is approximately 9 milliseconds. This represents the initial portions of tape sections 509 as they pass under recording and reading heads. The pulse $P_2$ initiates a computation period and ends a shift period of 9 milliseconds. $P_3$ ends the computation period, viz: the computation of command or attitude error signals. $P_4$ resets an output analog-to-digital converter which is employed with the air traffic control system. The time between the pulses $P_1$ and $P_3$ is 29 milliseconds; and the time between pulses $P_1$ and $P_4$ is 31 milliseconds.

The tape 501 is shown in FIG. 2 with the sprocket holes 506 disposed on each side. The positions of the read, normal record, and advance record heads are indicated again at 502, 503 and 504. It is to be noted that the sections 509 representing 33⅓ milliseconds data intervals are equal in length and two are included between the read and normal record points 502 and 503. One section 509 is disposed between the normal record and advanced record points 503 and 504. Erase as stated previously may occupy any desired tape length although two sections 509 between the read and normal record points 502 and 503 are provided for this purpose.

It is impractical to display graphically the successive lowering of schedule levels using 100 schedules and a nine incremental step break between each schedule. For this reason a staircase of a small representative system is shown in a waveform 301 in FIG. 3 where the incremental steps are shown to have a burst time substantial in comparison to the overall schedule step time. Only three incremental steps 302 mark the difference in schedule levels indicated at 303. Only four schedule levels are shown; therefore, in the utilization of a tape having only four data intervals would be employed. These data intervals are labelled A, B, C and D in FIG. 3. In the typical TTA generator the short counter 200 would be set to count three, and for four major steps 303 the long counter 300 should be set to count 13. The major step levels 303 in successive tape revolutions utilizing four data intervals, i.e. three from normal record point 503 to read point 502, is shown adjacent the waveform 301.

Schedule levels 401 are shown below the staircase waveform 301 in FIG. 3 illustrating the major schedule levels every fourth data interval, for example: a data interval 402 in coding the major steps 401 in FIG. 3 corresponds to a portion of the staircase waveform 302 indicated as 402'. Another tape revolution 403 including four of the major steps 401 is also represented in the staircase waveform 301 as a tape revolution 403'. The remaining data intervals 404 and 405 including the major steps 401 correspond to subsequent data not shown on the staircase waveform 301. It may be noted that the steps 401 representing the tape revolution 402 or 402' does in fact arrive at the same relative positions except after SL tape revolutions or 3×13=39 revolutions. This is due to the fact that the L is an odd number when $n=1$.

Tape sections A, B, C and D representative of those employed with the staircase TTA reference voltage 301 in FIG. 3 are so designated in FIG. 2.

The advantages of the present invention over mechanical apparatus is thus very obvious in that the invention may be constructed of only a few inexpensive component parts. Furthermore, the system is extremely flexible. Namely the short counter 200 and the long counter 300 may be suitably and easily connected to count any desired number of voltage pulses according to the varying needs of the same or different air traffic control systems.

While certain embodiments of the invention have been shown in detail, it will be apparent to those skilled in the art that changes may be made in the mode of operation and the forms of apparatus disclosed without departing from the spirit of the invention, and that certain features of the invention may be sometimes used without a corresponding use of other features.

What is claimed is:

1. In an air traffic control system, the combination comprising: means for periodically generating command signals at a rate R to guide the approaches of a number of aircraft C successively on a time shared basis to a landing system entry gate to cause each aircraft to arrive at the entry gate at least a time interval A later than a previous one; a timing pulse source for producing timing pulses at a rate R; a pulse generator; a bistable gate responsive to output pulses of said timing pulse source to pass the pulses generated by the pulse generator; a first pulse counter responsive to the pulses generated by the pulse generator and passed by said bistable gate for pulsing said bistable gate off, said first pulse counter being adapted to count a number of pulses S given by the following relationship:

$$S = \frac{nAR}{C}$$

where $n$ is any positive integer; means to reset said first pulse counter in response to the last of said S pulses; a second pulse counter responsive to the output pulses passed by the bistable gate for indicating the selected times to arrival of aircraft approaching the entry gate, said second pulse counter being adapted to count a number of pulses L given by the following relationship:

$$L = n(AR+1)$$

means to supply the output of said second pulse counter to said command signal generating means; means to reset said second pulse counter in response to the last of said L pulses; means for storing identities of guided aircraft; means operable for reproducing said identities one at a time from said storing means repeatedly in the same sequence; and means for synchronously operating said timing pulse source and said reproducing means to cause said aircraft identities to be reproduced at the rate R.

2. In an air traffic control system, the combination comprising: means for periodically generating command signals at a rate R to guide the approaches of a number of aircraft C successively on a time shared basis to a landing system entry gate to cause each aircraft to arrive at the entry gate at least a time interval A later than a previous one; a timing pulse source for producing timing pulses at the rate R; a pulse generator; a bistable gate responsive to output pulses of said timing pulse source to pass the pulses generated by the pulse generator; a first pulse counter responsive to the pulses generated by the pulse generator and passed by said bistable gate for pulsing said bistable gate off, said first pulse counter being adapted to count a number of pulses S given by the following relationship:

$$S = \frac{nAR}{C}$$

where $n$ is any positive integer; means to reset said first pulse counter in response to the last of said S pulses; a second pulse counter responsive to the output pulses passed by the bistable gate for indicating the selected times to arrival of aircraft approaching the entry gate, said second pulse counter being adapted to count a number of pulses L given by the following relationship:

$$L = n(AR+1)$$

a digital-to-analog converter connected at the output of said second pulse counter; means to reset said second pulse counter in response to the last of said L pulses; endless record means for storing identities of guided aircraft; a reproducing head disposed adjacent said record means to read information recorded thereon; and driving means for synchronously operating said timing pulse source and moving said record means across said reproducing head at a velocity to cause said aircraft identities to be reproduced at the rate R.

References Cited in the file of this patent

UNITED STATES PATENTS

| | | |
|---|---|---|
| 2,403,873 | Mumma | July 9, 1946 |
| 2,418,521 | Morton et al. | Apr. 8, 1947 |
| 2,709,770 | Hansen | May 31, 1955 |

UNITED STATES PATENT OFFICE
CERTIFICATE OF CORRECTION

Patent No. 3,050,708                      August 21, 1962

Alvin Guy Van Alstyne et al.

It is hereby certified that error appears in the above numbered patent requiring correction and that the said Letters Patent should read as corrected below.

Column 3, line 75, for "air", first occurrence, read -- error --; column 7, line 64, after "does" insert -- not --.

Signed and sealed this 5th day of March 1963.

(SEAL)
Attest:

ESTON G. JOHNSON                      DAVID L. LADD

Attesting Officer                      Commissioner of Patents